(12) United States Patent
Asher

(10) Patent No.: US 8,200,734 B1
(45) Date of Patent: Jun. 12, 2012

(54) LOOKUP-BASED GALOIS FIELD OPERATIONS

(75) Inventor: Michael Asher, Green Cove Springs, FL (US)

(73) Assignee: AT&T Intellectual Property II L.P.

( * ) Notice: Subject to any disclaimer, the term of this patent is extended or adjusted under 35 U.S.C. 154(b) by 1117 days.

(21) Appl. No.: 12/069,144

(22) Filed: Feb. 7, 2008

(51) Int. Cl.
*G06F 7/00* (2006.01)
(52) U.S. Cl. ...................................... 708/492
(58) Field of Classification Search ........................ None
See application file for complete search history.

(56) References Cited

U.S. PATENT DOCUMENTS

| | | | | |
|---|---|---|---|---|
| 4,509,172 A | * | 4/1985 | Chen | 714/759 |
| 4,800,515 A | * | 1/1989 | Hori et al. | 708/492 |
| 5,170,399 A | | 12/1992 | Cameron et al. | |
| 6,038,570 A | * | 3/2000 | Hitz et al. | 1/1 |
| 2005/0228842 A1 | * | 10/2005 | Pan et al. | 708/422 |
| 2008/0040416 A1 | * | 2/2008 | Forhan et al. | 708/492 |

* cited by examiner

*Primary Examiner* — Chat Do
*Assistant Examiner* — Michael D Yaary

(57) ABSTRACT

Computing the Q and the P syndromes, which is needed in RAID 6 systems is effected through use of a single ROM lookup table for the necessary finite field multiplication. In one embodiment, the P and Q syndromes for data that normally arrives with 8-bit words are created by using Galois Field $GF(2^4)$ arithmetic rather than the conventional $GF(2^8)$ arithmetic, thereby very significantly reducing the requires size of the lookup table.

14 Claims, 2 Drawing Sheets

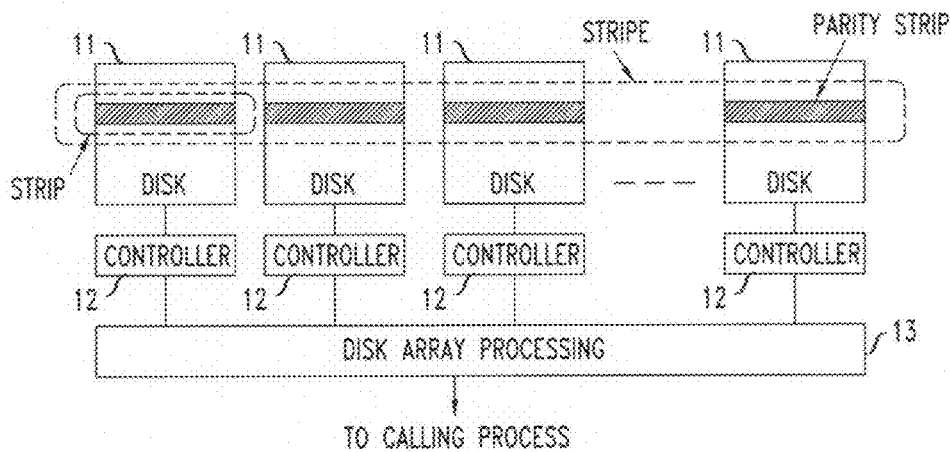
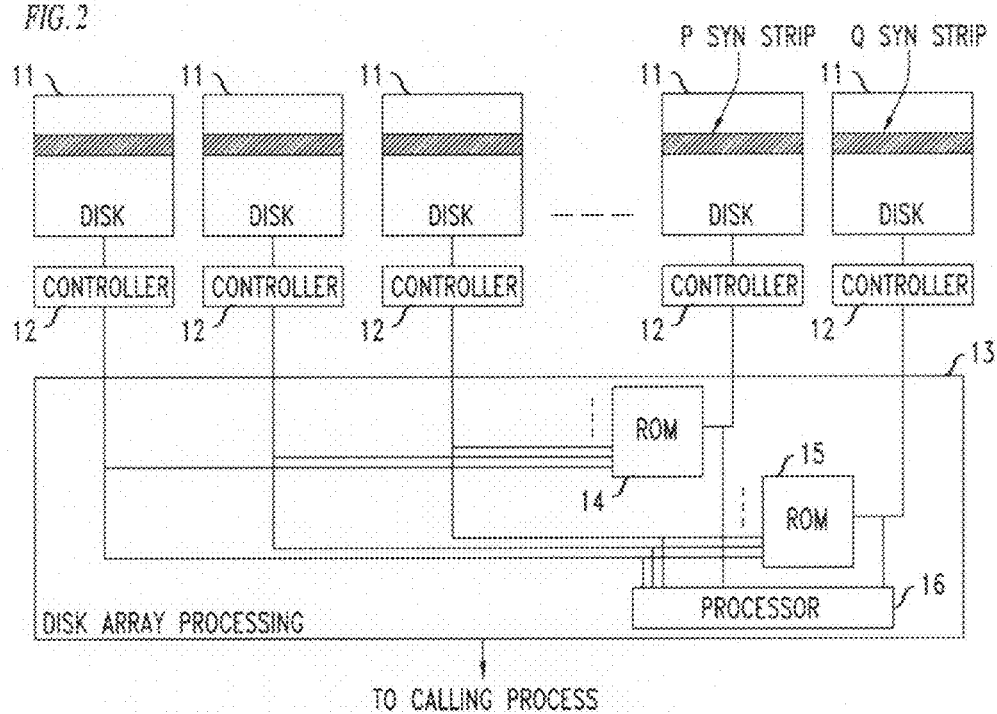
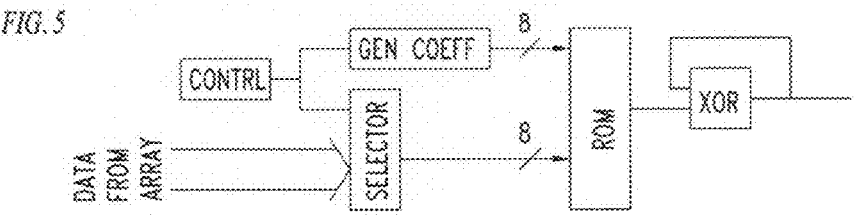

LOOKUP-BASED GALOIS FIELD OPERATIONS

BACKGROUND

This invention relates to processing circuits.

RAID (Redundant Array of Independent Drives) is a technique for creating what appears to be single logical storage device out of an array of physical hard drives, such as drives 11 in FIG. 1. The most common RAID technique is RAID level 5, in which a set of n separate physical hard drives are coalesced into a single memory array. The array is divided into stripes, as shown for example in FIG. 1, with a portion of each stripe—a "strip"—stored on each of the different physical drives in the set. Thus, n−1 of the strips hold data, and the $n^{th}$ strip holds parity information. The simplest way to visualize this arrangement is to think of one of the n hard drives holding the parity information. Many implementations, however, change the hard drive that holds the parity data from stripe to stripe.

When it is known that one of the hard drives that holds data fails to output proper data, the missing data can be reconstituted from the parity data. That is, when respective disk controllers 12 are able to report to array controller 13 that an error condition exists, controller 13 can recover the missing data, which allows the calling process to continue working while maintenance can take place on the failed drive, unaware that a problem was discovered. When data of a known drive is know to be wrong (and typically missing) the error is said to be an erasure error. As is well known, however, a single parity allows only one error can be detected (under the assumption that the probability of any other odd number of errors occurring concurrently is essentially zero), and thus when the location of the error is known (as in the case of erasure errors) the detected error can be corrected.

RAID level 6, which has recently been gaining in usage, employs two (or more) strips per stripe to hold redundant data, as illustrated in FIG. 2 for a system that employs exactly two strips per stripe to hold redundant data. The aim of such a RAID 6 system is to protect the array against two concurrent error conditions.

In both RAID 5 and RAID 6 systems the redundant data can be viewed as degenerates of a Reed-Solomon error-correcting code, based, for example, on Galois field $GF(2^8)$. The first redundant data strip (applies to both RAID 5 and RAID 6) holds the syndrome $$P = D_0 + D_1 + \ldots + D_{n-1} \quad (1)$$

and the second redundant data strip (RAID 6) holds the syndrome $$Q = g^0 \cdot D_0 + g^1 \cdot D_1 + \ldots + g^{n-1} \cdot D_{n-1} \quad (2)$$

where the polynomial g is a generator of the field and the "·" is multiplication over the field (which is NOT the normal multiplication), and the "+" designates the XOR operation. In $GF(2^8)$ there are 256 polynomial ($g^i$) coefficients, running from 0 to 255 and, therefore, equation (2) can handle 256 $D_i$ elements. If each $D_i$ element corresponds to the data of a strip, then operating in $GF(2^8)$ allows use of 256 data strips. Adding a strip for the P syndrome and a strip for the Q syndrome results in a maximum array of 258 hard drives, each of which stores/outputs 8 bit bytes.

There is another type of error for which current RAID techniques do not compensate, and that is the undetected read error. This occurs when, for a variety of reasons, controllers 12 fail to report a read error, and thus without an alert controller 13 provides the wrong value for a read request. Such events are uncommonly rare—a bit error rate of 1 in $10^{17}$ or less—and are thus usually ignored because a typical consumer desktop hard drive may go several years without a single such error.

However, the situation for a large RAID array experiencing continual usage is quite different. An array of 20 drives that runs in a 24×7 environment can read as many as $3 \times 10^{17}$ bits/year, and can thus experience multiple undetected read errors per year. Each is potentially a catastrophic event, because it may result in the altering of a mission-critical value; for example, a bank account balance, a missile launch code, etc. The silent nature of the error means that it cannot be trapped, and thus no corrective action can be taken by software or manual means.

Clearly, at least in some applications, it is desirable to have a means for detecting and correcting unreported errors, and in a co-pending application titled, Error Rate Reduction for Memory Arrays, and which is filed simultaneously with this application, a method is disclosed where at each "read" operation one of the syndromes is computed. It is desirable to have a quick and inexpensive way for computing these syndromes.

SUMMARY OF DISCLOSURE

In the course of storing data in a RAID 6 system both the P and the Q syndromes need to be computed in order to correct and detect an unreported error, and computing the Q syndrome involves multiple finite field multiplications and XOR operations. An advance in the art is achieved by reducing the complexity and/or necessary time for computing the P and Q syndromes by using tables stored in ROMs. In one embodiment, finite field multiplication is effected with single lookup of a table. In another embodiment, both the Q and P syndromes obtained directly from a table. In still another embodiment, the P and Q syndromes for data that normally arrives with 8-bit words are created by using Galois Field $GF(2^4)$ arithmetic rather than the conventional $GF(2^8)$ arithmetic, thereby very significantly reducing the requires size of the lookup table or tables.

BRIEF DESCRIPTION OF THE DRAWING

FIG. 1 depicts a disk array where data is stored in stripes of the array, where each stripe consists a strip in each of the disk, and where at least one of the strips provides a measure of redundancy for error control;

FIG. 2 depicts a RAID 6 disk array in accord with the principles disclosed herein;

FIG. 5 shows an implementation that employs one single ROM-based lookup table for efficiently computing the Q syndrome for a RAID 6 array.

DETAILED DESCRIPTION

Figure 3:
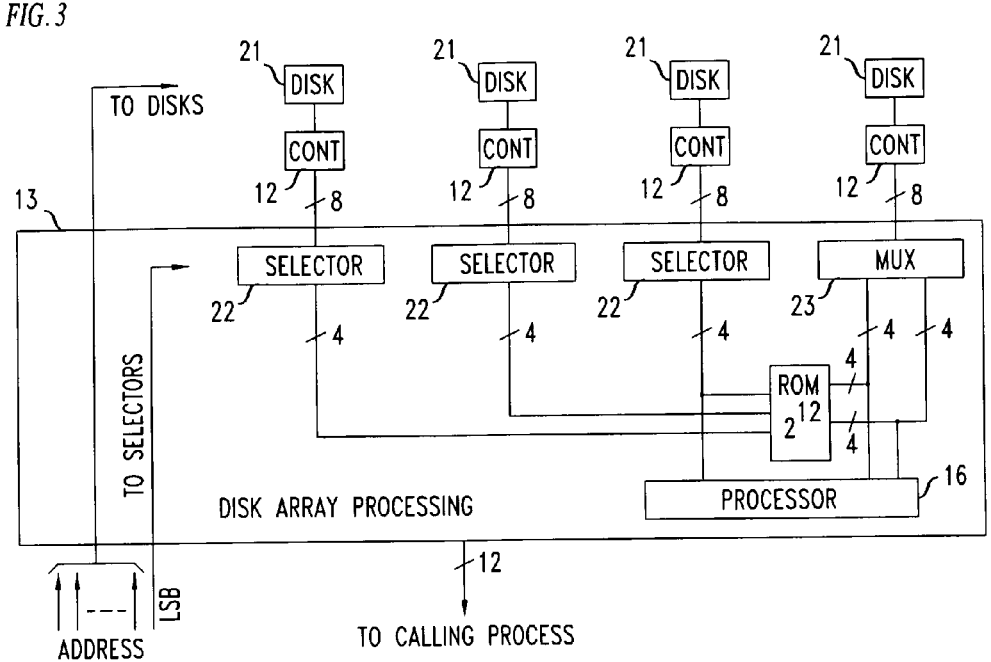
FIG. 3 depicts one embodiment of a disk array implementation that employs $GF(2^4)$ processing.

As indicated above, in both RAID 5 and RAID 6 systems the redundant data can be viewed as degenerates of a Reed-Solomon error-correcting code that is based, for example, on Galois field $GF(2^8)$. That is, the RAID 5 parity check corresponds to an RS(n,n−1) code, where n is the number of drives in the array, and the RAID 6 P and Q signatures are a RS(n, n−2) code.

Under the assumption that only one read error occurs that is not caught by controllers 12, in accord with the principles disclosed herein, data from the syndrome parity strip P is employed by array controller 13 as part of all read requests, and parity P' is computed in accordance with equation (1), and compared to the read parity P. When P'≠P it is concluded that an undetected read error has occurred, in which case data from syndrome strip Q is also used. The actual location of the error bit is determined, and the correct value is computed and substituted for erroneous data. This allows the error to be silently corrected without impacting the calling process.

To implement the above-disclosed approach, controller 13, which is the element that controls the entire array of hard drives, is modified to perform the error detection and correction. Specifically, when controller 12 is implemented with a stored program controlled processor and specialized hardware as disclosed below, the processor includes a subroutine such as the following read-data(address) subroutine:

```
read_data(address)   /read data from the array at 'address'
{
  read_disk_arrary(D)   /obtain the data from the individual disks (strips)
  p=identify_P_strip(address)   /identify the strip that holds P
  P'=compute_P_excluding_strip(p)   /compute P'
  if D(a)< >P' then   /error condition if read P is not the same as P'
    q=identify_Q_strip(address)   /identify the strip that holds Q
    fixError( )   /fix error
  End if
}
```

Of course, in order to fix the error, one must identify the strip in which the error occurs. Numerous techniques are known in the art for finding the strip that contains the error, e.g., Euclid's algorithm, Berlekamp-Massey, or some other similar well-known technique). See, for example, U.S. Pat. No. 5,170,399. The illustrative approach described below is a step-wise approach that is easy to understand. The algorithm considers each of the strips and computes a replacement D' for the considered strip based on the other strips and on the parity strip a replacement value. If the computed D' value is different from the read value then it is known that the strip under consideration is not the strip that contains the error.

```
fixError( )
{
For i=0 to (n−1)
compute D(j=i) from the other D(j< >i) values and P
compute Q' using the computed D(j=i).
if Q'< >Q then continue
else exit
end if
next
}
```

In a RAID 5 implementation, the only redundant data is the P' data, and therefore the presence of an unreported error can be deduced, but the location of the error itself cannot be ascertained. The error can be thus reported, but not corrected. Therefore, controller 13 propagates the error back up to the calling process to handle as it sees fit.

In the course of storing data in the FIG. 2 array, and in the course of performing the fixError( ) function, the Q syndrome needs to be determined. Since multiplication over the $GF(2^8)$ field that is necessary to effect (see equation (2) above) is quite complex, it is useful to take advantage of one or more lookup tables.

One approach that is highly efficient is to use a lookup table for the P and the Q syndromes, implemented in one or two ROMs. The input to the address port of the ROM is the concatenation of the data for which the syndromes need to be computed. To illustrate in connection with FIG. 2, where three data-holding strips are explicitly shown—each of which being one an 8-bit byte—in addition to the two redundant-data-holding strips, assuming that there are only the 3 data-holding strips, the address input to ROM 14 (which outputs an 8 bit byte corresponding to the P syndrome of equation (1)) is 24 bits long, which corresponds to an ROM that has a 24 bit address bus and stores $2^{24}$ 8 bit bytes i.e., 16 GBytes. The same is true for ROM 15, which outputs an 8 bit byte corresponding to the Q syndrome of equation (2).

In connection with the correcting of errors not reported by controllers 12, the above disclosed functions are carried out in processor 16 which, conveniently, may be a stored program controlled microprocessor.

To summarize a RAID 6 memory system that can store and deliver words that are 32 bits long can be implemented effectively with two ROMs, each of which has 16 Gbytes.

It may be observed that the above-disclosed approach of employing a ROM for developing the Q syndrome quickly becomes impractical to implement with current day ROM storage technologies. Four strips that hold 8-bit data (64-bit words) require a ROM for the Q syndrome that is 4 TBytes; and that is probably too large a memory for what can be economically purchased today.

An additional advance in the art is realized by employing $GF(2^4)$ rather than $GF(2^8)$. Working with $GF(2^4)$, the maximum number of data-holding strips that can be handled drops from 256 to 16, and each of the strips is a 4-bit nibble, which offers users a maximum word size of 64 bits.

One approach for implementing a RAID 6 array that is based on $GF(2^4)$ is to use hard drives the store/output 4 bit-nibbles. If one is constrained to use hard drives that inherently operate with 8-bit bytes, this can be achieved simply by having a selector at the output of the hard drive that, based on one of the address bits (e.g., the least significant bit) exposes one or the other 4 bit nibble in the 8-bit word. An implementation along these lines is depicted in FIG. 3, which uses 3 data-holding hard drives. On the positive side, it should be noted that each of the ROM's holds only $2^{12}$ entries (4 Kbytes), as compared to the $2^{24}$ entries in the $GF(2^8)$ implementation, and the entries are only 4 bits long as compared to 8 bit entries in the $GF(2^8)$ implementation—which allows using one ROM that outputs 8 bits per address (4 bits for the P syndrome and 4 bits for the Q syndrome). On the negative side, each clock cycle handles only words that are 12 bits long compared to the 24 bits in the above-disclosed $GF(2^8)$ implementation.

Figure 4:
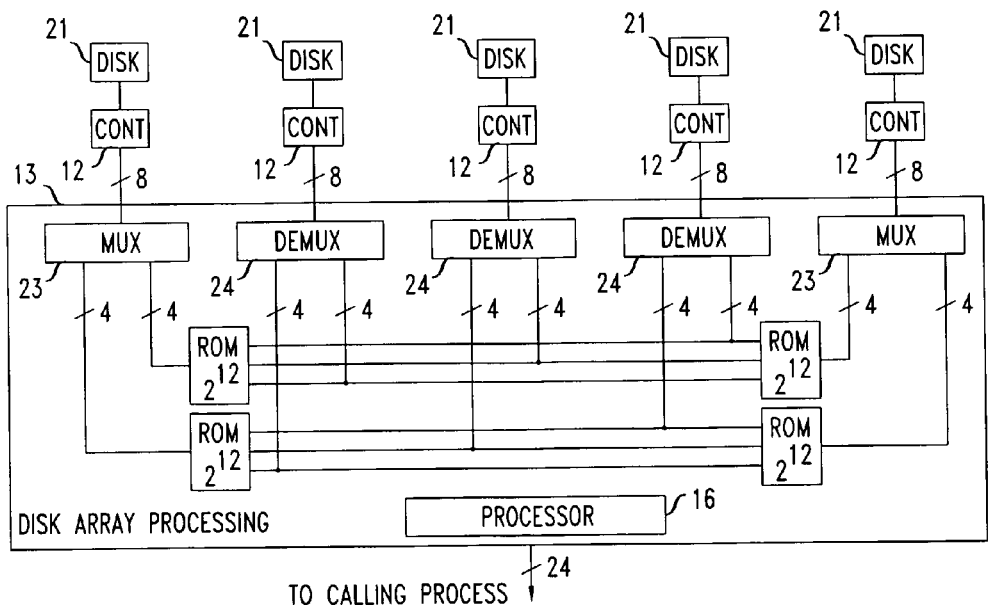
FIG. 4 depicts another embodiment of a disk array implementation that employs $GF(2^4)$ processing.

FIG. 4 depicts an implementation that handles 24 bits, and it should be noted that it requires a total of 4 ROM's each of which has $2^{12}$ entries that are 4 bits long, or 2 ROMs each of which has $2^{12}$ entries that are 8 bits long. Compared to the $GF(2^8)$ implementation that requires 2 ROMs that each contains $2^{24}$ entries, the FIG. 4 embodiment which requires 2 ROMs that each contains $2^{12}$ entries is very significantly less demanding. It may be noted that the FIG. 4 embodiment is limited to using not more than 16 hard drives, each providing 8 bits.

Another approach for computing the values of the Q and P syndromes that is not so limited focuses on the actual calculations that are represented by equations (1) and (2). Equation (1) is quite simple, since all that it requires is an XOR operation on n terms. Equation (2), however, requires n multiplications and XOR operations, and the bottleneck is the finite field multiplication across the $GF(2^8)$ Galois field.

Typically such multiplication is accelerated by taking the logarithm of both operands, adding the results module $2^8$ and then taking the anti-logarithm. This approach requires a log lookup table and an anti-log lookup table, and the operation requires 2 lookups of the log table, one modulo addition, and one lookup of the anti-log table, for a total of 3n lookups, n modulo additions, and (n−1) XOR operations; a total of 5n−1 operations.

An advance in the art is realized by coalescing the three lookups and the modulo addition into a single table (a ROM), resulting in only n lookups and n−1 XOR operations, for a total of 2n−1 operations. The inputs to the ROM are a generator coefficient and a corresponding data word, for example, $g^1$ and $D_1$, each of which is 8 bits long. Hence, the ROM needs to have only $2^{16}$ 8 bit entries. This is depicted in FIG. 5, which includes a small controller to select the generator coefficient that is extracted from a generator coefficients ROM and the data elements that is routed to the output of the selector. The selected elements are applied to the aforementioned ROM, and the output of the ROM is applied to an XOR circuit whose output is fed back to the XOR circuit.

The invention claimed is:

1. An arithmetic unit comprising:

M interfaces, each containing n leads, where K=M−L of the interfaces pertain to data strips, and remaining L>1 of the interfaces pertain to error detection-and-correction strips; and a read only memory (ROM) structure having K inputs that contain n leads each, said K inputs being coupled to said K interfaces, said structure developing L n-bit signature strips in response to data strips $D_i$, i=1, 2, . . . K, that are applied to said K interfaces, where said ROM structure includes a ROM module that in response to an input that is applied to an address port of the module and which includes data strip $D_i$, outputs an n-bit word that is related to $g^i \cdot D_i$, g is a preselected polynomial generator of said finite field, $g^i$ is a coefficient polynomial that corresponds to said polynomial generator raised to power i, and "·" is multiplication over the field;

where in response to data strips $D_i$, i=1, 2, . . . K applied to said K interfaces said ROM structure outputs a first of said L n-bit signature strips corresponding to $P=D_0+D_1+\ldots+D_{K-1}$ and a second of said L n-bit signature strips corresponding to $Q=g^0 \cdot D_0 + g^1 \cdot D_1 + \ldots + g^{M-1} \cdot D_{M-1}$.

2. The arithmetic unit of claim 1, where L=2, further comprising:

M memory units each providing a signal to a different one of said interfaces, substantially concurrently, and K of said M memory units that pertain to data are coupled to said K inputs of said ROM structure.

3. The arithmetic unit of claim 2 further comprising a controller coupled to said ROM structure, for applying said L n-bit signature strips to L of said interfaces, for storage in said L memory units that are coupled to said L interfaces.

4. The arithmetic unit of claim 3 where said controller:

accesses L n-bit strips from L of said memory units that are coupled to said L interfaces, compares the particular two of the accessed strips to said Q and P signature strips; and employs said Q and said P signature strips to modify the output signal delivered by one of said K memory units when said comparison determines that the compared signals are not the same.

5. The arithmetic unit as defined in claim 1 situated in an array-processing unit, further comprising:

K memory units that provide signals to said array-processing unit, substantially concurrently, where each memory unit j applies a word that is a concatenation of k segments of n bits each, to said array-processing unit;

k−1 additional arithmetic units as defined in claim 1, thereby forming a set of k arithmetic units, where n for k arithmetic units is equal to number of bits in each of said segments;

means for applying a different byte of the k segments of each of the K memory units to a different one of said k arithmetic units, thus creating an arrangement where arithmetic unit s, s=1, 2, . . . , k has at its address inputs segments $D_0^s, D_1^s, \ldots, D_{K-1}^s$ from memory units 1, 2, . . . K, respectively, and the ROM in arithmetic unit s stores word Q that corresponds to $Q=g^0 \cdot D_0^s + g^1 \cdot D_1^s + \ldots + g^{K-1} \cdot D_{K-1}^s$, or word P that corresponds to $P=D_0^s+D_1^s+\ldots+D_{K-1}^s$, or both, where $g^j$ is a generator of said field raised to $j^{th}$ power, "·" designates multiplication over the field, and "+" designates bit-wise XOR operation.

6. The arithmetic unit of claim 5 where n=4.

7. The arithmetic unit of claim 5 where n=4 and k=2.

8. The arithmetic unit of claim 5 where L=2 and each of the ROMs outputs both word Q and word P.

9. The arithmetic unit as defined in claim 1 situated in an array-processing unit, where L is either 1 or 2, further comprising:

K memory units that provide signals to said array-processing unit, substantially concurrently, where each memory unit j applies a word that is a concatenation of k segments of n bits each, to said array processing unit;

a selector interposed between said K memory units and said input; and a controller for causing said selector to apply to said input, in each of k intervals, a different segment of said k segments.

10. The arithmetic unit of claim 9 further comprising for a combiner responsive to said output leads that, under direction of said controller forms an output of kLn bits from a set of k outputs appearing at said output leads in the course of k intervals.

11. The arithmetic unit of claim 10 where, when L=1, said combiner outputs a set of kn bits, which are applied to a $(K+1)^{th}$ memory unit, and when L=1, said combiner outputs an additional set of kn bits, which are applied to a $(K+2)^{th}$ memory unit with L.

12. An arithmetic unit comprising:

M interfaces, each containing n leads, where K=M−L of the interfaces pertain to data strips, and remaining L>1 of the interfaces pertain to error detection-and-correction strips;

a read only memory (ROM) structure having K inputs that contain n leads each, said K inputs being coupled to said K interfaces, said structure developing L n-bit signature strips in response to data strips $D_i$, i=1, 2, . . . K, that are applied to said K interfaces, where said ROM structure includes a ROM module that in response to an input that is applied to an address port of the module and which includes data strip $D_i$, outputs an n-bit word that is related to $g^i \cdot D_i$, g is a preselected polynomial generator of said finite field, $g^i$ is a coefficient polynomial that corresponds to said polynomial generator raised to power i, and "·" is multiplication over the field; and a coupling module interposed between at least K of said M interfaces and said ROM structure, where the coupling module includes K selectors having n input leads each that are coupled to respective ones of said K interfaces, where each of the selectors connects a different submultiple of n/p of its inputs to its output in successive time intervals, where p is an integer greater than 1; and said ROM structure comprises
- at least said one ROM module having nlp inputs and p sets of outputs, each of the output sets having n/p leads; and
- a multiplexer for combining said p output sets to form a single set of n leads.

13. An arithmetic unit for operating in accordance with finite field arithmetic, where the finite field is of characteristic 2, having $2^n$ elements, each specified by an n-bit word, comprising:

an input for accepting one or more n-bit words that are elements of the field;

output leads; and at least one ROM having at Ln outputs and Kn address inputs for accessing $2^{Kn}$ storage locations, where K is an integer satisfying the relationship $1 < K \leqq 2^n$, and L is an integer greater than 0, each location of said memory comprises one or more elements of said field, each of which results from an operation that involves a finite field product of
- (a) an element of said field that is coupled from said input to n address inputs of said ROM and
- (b) an element of said field that is applied to another n of said Kn address inputs of said ROM, and said Ln outputs are coupled to said outputs of said arithmetic unit;

K memory units that provide a signal to said input, substantially concurrently, where memory unit j applies an n-bit word $D_j$ that is an element of said field to said input of the arithmetic unit, and the n outputs of the ROM output a word, Q, that is an element of the field, corresponding to $Q = g^0 \cdot D_0 + g^1 \cdot D_1 + \ldots + g^{K-1} \cdot D_{K-1}$, where $g^j$ is a generator of said field raised to $j^{th}$ power, "·" designates multiplication over the field, and "+" designates bit-wise XOR operation.

14. The arithmetic unit of claim 13 further comprising a controller coupled to outputs of said K memory units, to said output of said ROM, and to an output of a $(K+1)^{th}$ memory unit, and said controller:

accesses an output of said $(K+1)^{th}$ memory unit when said K memory units apply signals to said input, compares the accessed output to the output of the ROM, and reports that an error condition exists when said accessed output of the $(K+1)^{th}$ memory unit is not the same as the output of the ROM.

* * * * *